United States Patent Office 3,475,750
Patented Oct. 28, 1969

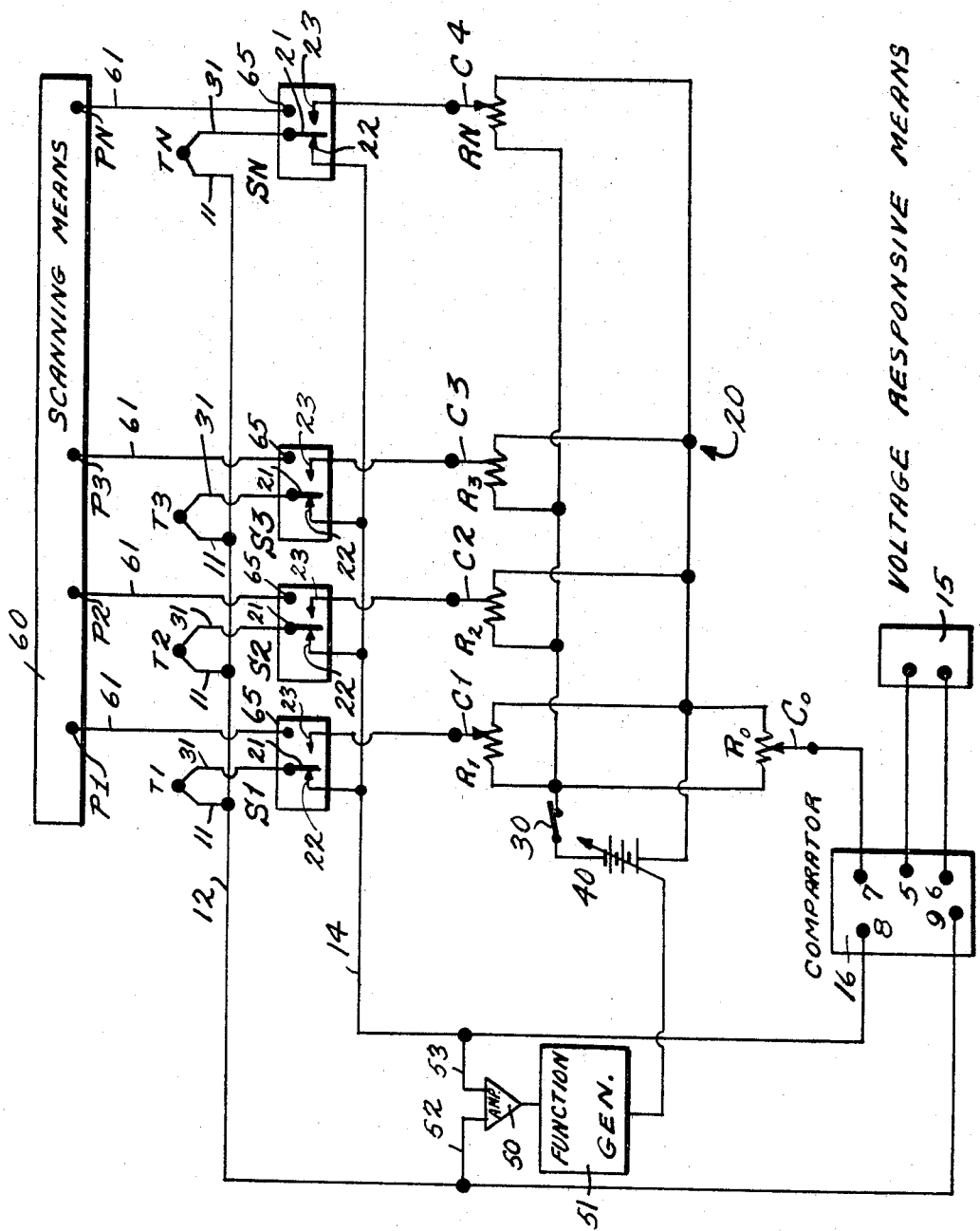

3,475,750
TEMPERATURE MONITORING AND
ALARM APPARATUS
John S. Howell and Robert L. Hartung, Fort Worth, Tex., assignors to Howell Instruments, Inc., Fort Worth, Tex., a corporation of Texas
Filed Feb. 18, 1966, Ser. No. 528,467
Int. Cl. G08b 17/06
U.S. Cl. 340—413         7 Claims

ABSTRACT OF THE DISCLOSURE

This invention relates to a temperature monitoring system. Several temperature sensors are located at various points in systems such as internal combustion engines. The sensors, which produce a voltage proportional to the temperature monitored, are scanned and the voltage of each sensor is compared to the average of the other sensor voltages. The difference between each sensor and the average is displayed on a meter or is used to actuate an alarm.

---

This invention relates to temperature monitoring apparatus, and more porticularly to apparatus of this type for monitoring the temperature at a plurality of zones.

In various systems such as supercharging turbines, internal combustion engines and pumps as well as many other systems, the temperature at various points within such systems must be continuously monitored during operation in order to detect excessive loading or malfunction. In internal combustion engines, for example, a variation in the operating temperature of any one cylinder, when the engine is experiencing a constant load, would indicate an excessive load on that cylinder or a malfunction therein. In order to detect such malfunction or excessive load the temperature at each cylinder must be monitored. It is necessary in systems such as these to also discriminate between normal temperature variations due to changes in the load on the system which would increase or decrease the temperature of each zone a substantially like amount and temperature variations due to malfunction or excessive loading at any one zone. These later temperature variations occur only at the malfunctioning zone. According to the present invention this accomplished by comparing the temperature of each zone a reference temperature equal to the average operating temperature of the system. Since the average temperature is dependent on the load on the system, temperature variations at each cylinder due to system load variations are cancelled by this referencing of each monitored temperature to the average temperature of the system.

In accordance with the instant invention electronic means are provided to perform this monitoring function. At each of the plurality of zones, a temperature responsive device is provided which develops a D.C. voltage proportional to the temperature being sensed. A voltage proportional to the average temperature of the zones is obtained by connecting the outputs of the temperature responsive devices in parallel. Switching means are provided to selectively and periodically disconnect the output of each temperature sensing device from the parallel circuit and connect in series with a bias signal voltage source to one input of a comparator, the other input to the comparator being the output from the other parallel connected temperature responsive devices, the output of the comparator thereby being proportional to the difference between the temperature at one zone plus a bias signal and the average temperature at the other zones. Voltage responsive means such as a meter or alarm, connected to the output of the comparator, are provided to automatically indicate a malfunction. In the case where an alarm is employed, the alarm device is set to be actuated whenever the output of the comparator exceeds a predetermined value which would indicate a malfunction.

The bits signals are required due to the fact that in devices such as internal combustion engines, turbines and the like, the nominal temperatures at the various monitored zones are not equal. The bias signals weight each individually sensed temperature so that the weighted temperature of any one zone equals the average non-weighted temperature of the other zones. This weighting feature allows vary sensitive setting of the alarm device would not be possible if the alarm had to accommodate the range of temperature of the plurality of zones.

For example, say three zones are being sensed, the nominal temperatures during normal operation being 60°, 70° and 80° respectively and a 5° variation from the nominal temperature at any zone would indicate a malfunction. If the voltage responsive device were set to indicate malfunction whenever the temperature at any one zone varied by 5° from the average, which is 70°, the 60° and 80° zones, when sensed, would always cause a malfunction indication because they vary by more than 5° from the average during normal operation. With addition of the bias signals the temperature of the 60° and 80° zones are weighted to equal 70°, thereby allowing the setting of the voltage responsive device to a 5° sensitivity.

Other features and advantages of the invention will become apparent from a consideration of the following detailed description and from the drawing which is a schematic diagram of a preferred embodiment of the invention.

Referring now to the drawing, thermocouples T1, T2, T3 . . . TN are located at the various temperature zones to be sensed, N being equal to the number of zones. Output leads 11 of each thermocouple are connected in common by lead 12 to common input terminal 9 of comparator 16. Switches S1–SN are of the single pole double throw type and may be either electro-magnetic relays, transistor flip flops or any other equivalent switching structure. For the purposes of illustration only, the switches are shown as relays having an armature 21, normally closed contacts 22 and normally open contacts 23, the actuating coils are not shown. The average temperature terminal 8 of the comparator is connected to each of the normally closed contacts of switches S1–SN by lead 14.

The output leads 31 of the thermocouples are each connected to a different one of the armatures of switches S1–SN. These switches, when not actuated as shown, connect each of the thermocouples in parallel across terminals 8 and 9 of the comparator.

Bias signal voltage producing means 20 comprises a direct current voltage source 40 and a plurality slide wire resistors R0, R1, R2 . . . RN connected in parallel through switch 30 to the said source 40. Associated with each slide wire resistance is a contact arm C0, C1 . . . CN respectively. Each normally open contact of switches S1–SN is connected to a different one of the contact arms C1–SN. The contact arm associated with slide wire resistor R0 is connected to the individual temperature terminal 7 of the comparator.

A scanning means 60, has output terminals P1–PN, each of these output terminals are connected to a terminal 65 of switches S1–SN respectively. The actuating coils for each of these switches are connected to terminal 65 so that operation of the scanning means will selectively and periodically actuate momentarily each of the switches S1–SN. Scanning means 60 may be a shift register, mechanical stepping switch or any other suitable scanning means.

Voltage responsive indicator 15 is connected to the output terminals 5 and 6 of the comparator and may be either a meter to indicate the magnitude of the output of comparator 16 and/or a threshold responsive alarm device which would be actuated whenever the output of the comparator exceeds a predetermined value.

The operation of the device as thus described is as follows. With switch 30 open, as the scanning means scans relays S1–SN the output of the comparator will be equal to the absolute difference between the average temperature and the temperature of the zone being monitored.

When switch 30 is closed, bias voltage appears between contact arms C1–CN and C0. With the device to be monitored operating normally, that is the temperature at each zone being nominal, the contact arms C1 to CN are adjusted so that the output of the comparator is zero for each monitored zone. If the temperature at any one zone, say the zone sensed by T1, should vary from its nominal temperature, when switch S1 is actuated by the scanning means 60 the comparator will have an output proportional to the amount the temperature at this zone has varied from its nominal value. If the temperature at any zone should vary to such a degree as to indicate malfunction, the output of comparator 16 when that zone is sensed would be sufficient to cause a malfunction indication at 15.

Also shown in FIG. 1 is an amplifier 50 the input of which is connected to leads 12 and 14 by leads 52 and 53 respectively. The output of amplifier 50 is connected to a function generator 51 which in turn is operatively coupled to direct current voltage source 40. The function of this combination is to vary all of the bias voltages simultaneously in accordance with a predetermined function of variations in the average temperature of the zones by varying source 40. A function generator suitable for use in the instant invention would be a programmable servomotor, the output of which would be mechanically coupled to the source 40 to effect variation thereof in accordance with the programmed function of variations in the average temperature. It has been determined that the programmed bias variation feature is not required when the load variations on the systems being monitored are small, however, for large load variations, a degradation in accuracy and sensitivity is experienced which is eliminated by the use of the programmable bias variation feature.

What is claimed is:

1. A temperature monitoring system for monitoring the temperature at a plurality of zones comprising a plurality of temperature sensing devices, one at each zone for sensing the temperature thereat, each of said temperature sensing devices presenting an output voltage proportional to the temperature being sensed, means in circuit with said sensing devices for selecting any one of said temperature sensing devices, means for providing a plurality of variable bias voltage sources, one source of bias voltage in circuit with each of said temperature sensing devices, means connecting the output of the selected temperature sensing device in series with its associated source of bias voltage, means in circuit with said sensing devices for averaging the output of all the non-selected temperature sensing devices and means in circuit with said sensing means for comparing the average output of the non-selected temperature sensing devices with the sum of the output of the selected temperature sensing device and its assocated bias voltage.

2. The device of claim 1 wherein said means for selecting any one of said temperature sensing devices comprises a plurality of switches, one for each of said temperature sensing devices, each of said switches having a first unactuated state and second actuated state, said switches, when in said first state, being adapted to connect the output of said temperature sensing devices in parallel and when in said second state, being adapted to connect the output of each of said temperature sensing devices in series with a different one of said bias voltage sources and scanning means for selectively and periodically actuating momentarily each of said switches.

3. The device of claim 1 wherein said means for providing a plurality of variable bias voltage source comprises as source of D.C. voltage, a plurality of slide wire resistors, said slide wire resistors being connected in parallel across said source of D.C voltage, a contact arm cooperative with each of slide wire resistors, the contact arm of one of said slide wire resistors comprising a common output terminal of said plurality of bias voltage sources and the contact arms of the remaining slide wire resistors comprising the other output terminal of each of said plurality of bias voltage sources.

4. The device of claim 3 further comprising means responsive to variations in the output of the parallel connected temperature sansing devices for varying the magnitude of said source of D.C. voltage in accordance with a predermined function of said variations.

5. The device of claim 1 further comprising alarm means and means for energizing said alarm means whenever the weighted temperature at any one zone varies by a predetermined amount from the average temperature of the other zones.

6. The device of claim 1 wherein the magnitude of each of said bias voltages is such that the sum of the output of each temperature sensing device and its associated bias voltage is equal to the average output of the remaining temperature sensing devices when the temperature at each zone is nominal.

7. The device of claim 1 further comprising means responsive to variations in the average output of the non-selected temperature sensing device to simultaneously vary all of said bias voltages in accordance with a predetermined function of said variations.

References Cited

UNITED STATES PATENTS

| 3,120,758 | 2/1964 | Craddock | 340—183 X |
| 3,272,012 | 9/1966 | Seney | 340—183 X |

THOMAS B. HABECKER, Primary Examiner

C. M. MARMELSTEIN, Assistant Examiner

U.S. Cl. X.R.

340—183, 213, 227